(12) United States Patent
Takahashi

(10) Patent No.: US 7,440,233 B2
(45) Date of Patent: Oct. 21, 2008

(54) MAGNETIC RECORDING MEDIUM AND INFORMATION REPRODUCING APPARATUS

(75) Inventor: Shinichi Takahashi, Kawasaki (JP)

(73) Assignee: Fujitsu Limitd, Kawasaki (JP)

( * ) Notice: Subject to any disclaimer, the term of this patent is extended or adjusted under 35 U.S.C. 154(b) by 414 days.

(21) Appl. No.: 11/057,725

(22) Filed: Feb. 14, 2005

(65) Prior Publication Data

US 2006/0105204 A1    May 18, 2006

(30) Foreign Application Priority Data

Nov. 17, 2004    (JP)    ............... 2004-333509

(51) Int. Cl.
    G11B 5/66    (2006.01)
    G11B 5/716    (2006.01)
    G11B 5/82    (2006.01)

(52) U.S. Cl. .................. 360/135; 428/832; 428/833.4; 428/833.6; 428/841.3

(58) Field of Classification Search .............. 360/135; 428/833, 825, 825.1, 832, 833.1–833.6, 835.8, 428/835.9, 841
    See application file for complete search history.

(56) References Cited

U.S. PATENT DOCUMENTS 5,650,900 A * 7/1997 Wei et al. ................. 360/135
5,674,582 A * 10/1997 Eltoukhy et al. ......... 428/848.1
5,930,073 A * 7/1999 Tanaka et al. ............ 360/97.02
6,168,831 B1 * 1/2001 Khan et al. ................ 427/240
6,299,946 B1 * 10/2001 Toyoguchi et al. ......... 427/512
6,620,481 B2 * 9/2003 Toyoguchi .................. 428/831
2003/0211277 A1 * 11/2003 Ma et al. ................... 428/65.4

FOREIGN PATENT DOCUMENTS

| JP | 62-226423 | 10/1987 |
| JP | 2000-268358 | 9/2000 |
| JP | 2001-134924 | 5/2001 |
| JP | 2002-516454 | 6/2002 |
| JP | 2002-268358 | 9/2002 |

* cited by examiner

*Primary Examiner*—Andrea Wellington
*Assistant Examiner*—Adam B Dravininkas
(74) *Attorney, Agent, or Firm*—Greer, Burns & Crain, Ltd.

(57) ABSTRACT

The present invention provides a magnetic recording medium with a reduced tendency for a free layer to become thicker near an outer periphery than near an inner periphery of a recording zone as well as provides an information reproducing apparatus which is equipped with the magnetic recording medium and reproduces information according to the magnetization at various points on the magnetic recording medium. A magnetic layer carries information in an outer zone outside a predetermined inner zone around a through-hole. That part of the free layer which is located in the outer zone is thinner near the outer periphery than near the inner periphery.

8 Claims, 7 Drawing Sheets

MAGNETIC RECORDING MEDIUM AND INFORMATION REPRODUCING APPARATUS

BACKGROUND OF THE INVENTION

1. Field of the Invention

The present invention relates to a magnetic recording medium which records information using magnetization directions as well as to an information reproducing apparatus which is equipped with the magnetic recording medium and reproduces information according to the magnetization at various points on the magnetic recording medium.

2. Description of the Related Art

Recently, with the spread of computers, large volumes of information have been handled on a daily basis. Apparatus which handle such large volumes of information include a hard disk drive (HDD). The HDD incorporates amagnetic disk, i.e., a disk-shaped magnetic recording medium on which information is recorded, and a magnetic head which records and reproduces information on/from the magnetic disk.

The magnetic disk has a magnetic layer of ferromagnetic material formed on a non-magnetic substrate. The magnetic layer is divided into minute areas and information is carried by magnetization directions of the minute areas. A protective layer of carbon or the like is formed on the magnetic layer and a lubricating film of perfluoropolyether (PFPE) is formed on the protective layer.

FIG. 1 is a diagram schematically showing a lubricating film of a conventional magnetic disk.

A magnetic disk which has the lubricating film 900 shown in FIG. 1 has a through-hole in the center and carries information in an outer zone outside a predetermined inner zone around the through-hole. Hereinafter, the outer zone will be referred to as a recording zone. A hub rotated by a drive motor is mounted in the through-hole in the magnetic disk, and the magnetic disk rotates around the dashed line at the left of FIG. 1 during operation of the HDD. A magnetic head incorporated in the HDD is placed in proximity to the magnetic disk and a floating surface comes into contact with and slides over a surface of the magnetic disk when the magnetic disk starts or stops to rotate, but it remains floating over the magnetic disk during rotation of the magnetic disk.

The lubricating film 900 plays a role in reducing wear caused by sliding of the magnetic head and in preventing the information carried by the magnetic layer from being destroyed due to contact with the magnetic head (head crash). The lubricating film 900 shown in FIG. 1 is formed by applying liquid PFPE uniformly to the surface of the protective film with an accuracy on the order of 0.1 nm (Å) and solidifying it subsequently by heat treatment or ultraviolet irradiation. Although the lower part of the lubricating film 900 thus formed is in close contact with the protective film, its upper part moves toward the outer periphery (outer side) of the magnetic disk due to centrifugal force generated by the rotation of the magnetic disk. This movement is sometimes referred to as a migration phenomenon. In FIG. 1, the lower part of the lubricating film 900 which is in intimate contact with the protective film is shown as a bonding layer 910 while the upper part which is moved outward by centrifugal force is shown as a free layer 920. The free layer 920 has the self-repairing effect of filling scratches produced by collisions with the magnetic head, by being moved by centrifugal force. The thickness of the bonding layer 910 in FIG. 1 is uniform in the radial direction of the magnetic disk and so is the thickness of the free layer 920.

Also, various proposals have been made about lubricating films (see, for example, Japanese Patent Laid-Open No. 2000-268358, National Publication of International Patent Application No. 2002-516454, Japanese Patent Laid-Open Nos. 62-226423, and 2001-134924). Japanese Patent Laid-Open No. 2000-268358 discloses a lubricating film in which a bonding layer is thicker in an inner zone (CSS zone) around a through-hole in a magnetic disk than in a recording zone outside the CSS zone. Japanese Patent Laid-Open No. 2002-516454 discloses a lubricating film which is thinner in an inner zone (landing zone) than in a recording zone outside the landing zone. Japanese Patent Laid-Open No. 62-226423 discloses a lubricating film whose thickness is at its maximum in the innermost zone and decreases with increasing distance from the center. Japanese Patent Laid-Open No. 2001-134924 discloses a technique of reducing the thickness of a free layer.

However, when the magnetic disk rotates for a long time, the free layer 920 on the bonding layer 910 which has a uniform thickness (shown in FIG. 1) or the free layer on the bonding layer which becomes thicker with decreasing distance from the center (disclosed in Japanese Patent Laid-Open No. 2000-268358) tends to lean to the outer side due to the migration phenomenon.

FIG. 2 is a graph showing film thickness of the lubricating film shown in FIG. 1 in the radial direction of a magnetic disk after the magnetic disk with the lubricating film is rotated continuously at 10,000 rpm in a high-temperature environment for 30 days.

The horizontal axis of the graph shown in FIG. 2 represents the radial distance (mm) from the center of the magnetic disk while the vertical axis represents the film thickness (Å) of the lubricating film. The graph in FIG. 2 shows the film thickness of the lubricating film in a recording zone which carries information. It can be seen from FIG. 2 that the lubricating film becomes thicker with increasing distance from the center of the magnetic disk. This is believed to be because the free layer 920 is moved to the outer side due to the migration phenomenon.

In the case of the lubricating film whose thickness in the landing zone is increased, i.e., the lubricating film disclosed in National Publication of International Patent Application No. 2002-516454, although the free layer is thicker in the inner landing zone than in the outer recording zone, the thickness of the free layer in the recording zone is uniform in the radial direction and thus, that part of the free layer which is located in the recording zone tends to lean to the outer side due to the migration phenomenon.

If the free layer leans to the outer side, that part of the free layer which is on the outer side becomes thicker than that part of the free layer which is on the inner side and can easily hit the magnetic head floating over it, damaging or contaminating the magnetic head. The free layer leaning to the outer side can eventually scatter out of the magnetic disk due to centrifugal force. If the free layer is removed from the top of the bonding layer, the self-repairing effect can no longer be realized. Besides, the magnetic head touching the bonding layer is liable to wear and damage. Furthermore, head crashes can occur frequently. Thus, it is desired to minimize the possibility of the free layer becoming thicker near the outer periphery of the recording zone than near the inner periphery.

In the case of the lubricating film which becomes thinner with increasing distance from the center of the magnetic disk, i.e., the lubricating film disclosed in Japanese Patent Laid-Open No. 62-226423, the bonding layer and free layer are not distinguished, and thus, it is not possible to discuss the migration phenomenon. Even if the thickness of the free layer is decreased using the technique disclosed in Japanese Patent Laid-Open No. 2001-134924, the tendency for the free layer to lean to the outer side due to the migration phenomenon remains unchanged. Besides, if the thickness of the free layer is reduced too much, the free layer tends to be removed from the top of the bonding layer, again resulting in a problem described above.

SUMMARY OF THE INVENTION

The present invention has been made in view of the above circumstances and provides a magnetic recording medium with a reduced tendency for a free layer to become thicker near an outer periphery than near an inner periphery of a recording zone as well as provides an information reproducing apparatus which is equipped with the magnetic recording medium and reproduces information according to magnetization at various points on the magnetic recording medium.

The present invention provides a first magnetic recording medium which records information using magnetization directions, having:

a disk-shaped substrate which has a through-hole in the center;

a magnetic layer which is provided on the substrate and records information using the magnetization directions;

a protective layer which is provided on the magnetic layer;

a bonding layer which is attached to the protective layer and contains a lubricant component; and a free layer which contains a lubricant component and is movable on the bonding layer toward the outer periphery of the substrate as the magnetic recording medium rotates around the center of the substrate, wherein the magnetic layer carries information in an outer zone outside a predetermined inner zone around the through-hole, and that part of the free layer which is located in the outer zone is thinner near the outer periphery than near the inner periphery.

With the first magnetic recording medium of the present invention, since the free layer on the outer zone is thinner near the outer periphery than near the inner periphery, even if a migration phenomenon occurs, the tendency for the part near the outer periphery to become thicker than the part near the inner periphery is reduced. In the first magnetic recording medium, that part of the free layer which is located in the outer zone may become thinner either gradually or stepwise from the inner periphery to the outer periphery.

The present invention provides a second magnetic recording medium which records information using magnetization directions, having:

a disk-shaped substrate;

a magnetic layer which is provided on the substrate and records information using the magnetization directions;

a protective layer which is provided on the magnetic layer;

a bonding layer which is attached to the protective layer and contains a lubricant component; and a free layer which contains a lubricant component and is movable on the bonding layer toward the outer periphery of the substrate as the magnetic recording medium rotates around the center of the substrate, wherein a surface of the bonding layer is higher near the outer periphery than near the center of the substrate.

With the second magnetic recording medium of the present invention, since the surface of the bonding layer is higher near the outer periphery than near the center of the substrate, the height difference in the radial direction makes it difficult for the free layer to be moved to the outer periphery by centrifugal force. Consequently, the tendency for the free layer to become thicker near the outer periphery than near the inner periphery is reduced. In the second magnetic recording medium, the surface of the bonding layer may become higher either gradually or stepwise from the center to the outer periphery.

Also, in the magnetic recording medium of the present invention, preferably the free layer has a flat surface, or the combined thickness of the bonding layer and the free layer is uniform in the radial direction of the substrate.

The present invention provides a first information reproducing apparatus that, being equipped with a disk-shaped magnetic recording medium on which information is recorded by means of magnetization and a magnetic head placed in close vicinity to or in contact with the magnetic recording medium to detect magnetization at various points on the magnetic recording medium, reproduces information according to the detected magnetization at the various points on the magnetic recording medium by rotating the magnetic recording medium, wherein:

the magnetic recording medium which records information using magnetization directions, has:

a disk-shaped substrate which has a through-hole in the center, a magnetic layer which is provided on the substrate and records information using the magnetization directions, a protective layer which is provided on the magnetic layer, a bonding layer which is attached to the protective layer and contains a lubricant component, and a free layer which contains a lubricant component and is movable on the bonding layer toward the outer periphery of the substrate as the magnetic recording medium rotates around the center of the substrate;

the magnetic layer carries information in an outer zone outside a predetermined inner zone around the through-hole; and that part of the free layer which is located in the outer zone is thinner near the outer periphery than near the inner periphery.

The present invention provides a second information reproducing apparatus that, being equipped with a disk-shaped magnetic recording medium on which information is recorded by means of magnetization and a magnetic head placed in close vicinity to or in contact with the magnetic recording medium to detect magnetization at various points on the magnetic recording medium, reproduces information according to the detected magnetization at the various points on the magnetic recording medium by rotating the magnetic recording medium, wherein:

the magnetic recording medium has:

a disk-shaped substrate, a magnetic layer which is provided on the substrate and records information using the magnetization directions, a protective layer which is provided on the magnetic layer, a bonding layer which is attached to the protective layer and contains a lubricant component, and a free layer which contains a lubricant component and is movable on the bonding layer toward the outer periphery of the substrate as the magnetic recording medium rotates around the center of the substrate; and a surface of the bonding layer is higher near the outer periphery than near the center of the substrate.

In the information reproducing apparatus again, preferably the free layer has a flat surface, or the combined thickness of the bonding layer and the free layer is uniform in the radial direction of the substrate.

The present invention can provide a magnetic recording medium with a reduced tendency for a free layer to become thicker near an outer periphery than near an inner periphery of a recording zone as well as provide an information reproducing apparatus which is equipped with the magnetic recording medium and reproduces information according to magnetization at various points on the magnetic recording medium.

DETAILED DESCRIPTION OF THE INVENTION

Embodiments of the present invention will be described below with reference to the drawings.

An embodiment of the present invention will be described below.

Figure 1:
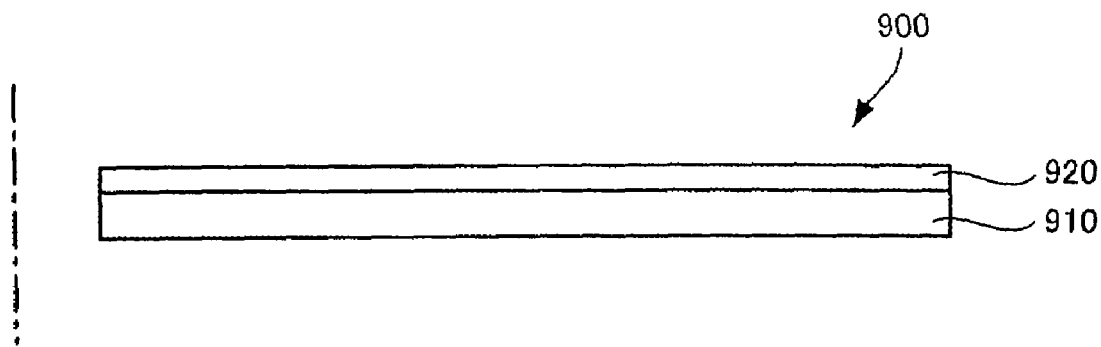
FIG. 1 is a diagram schematically showing a lubricating film of a conventional magnetic disk.
Figure 2:
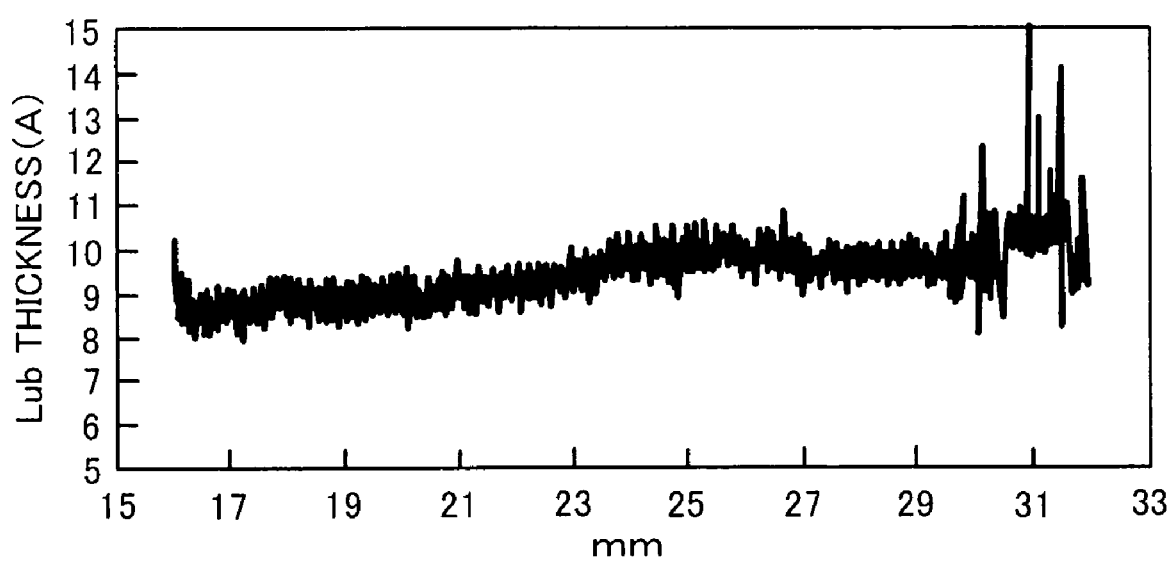
FIG. 2 is a graph showing film thickness of the lubricating film shown in FIG. 1 in the radial direction of a magnetic disk after the magnetic disk with the lubricating film is rotated continuously at 10,000 rpm in a high-temperature environment for 30 days.
Figure 3:
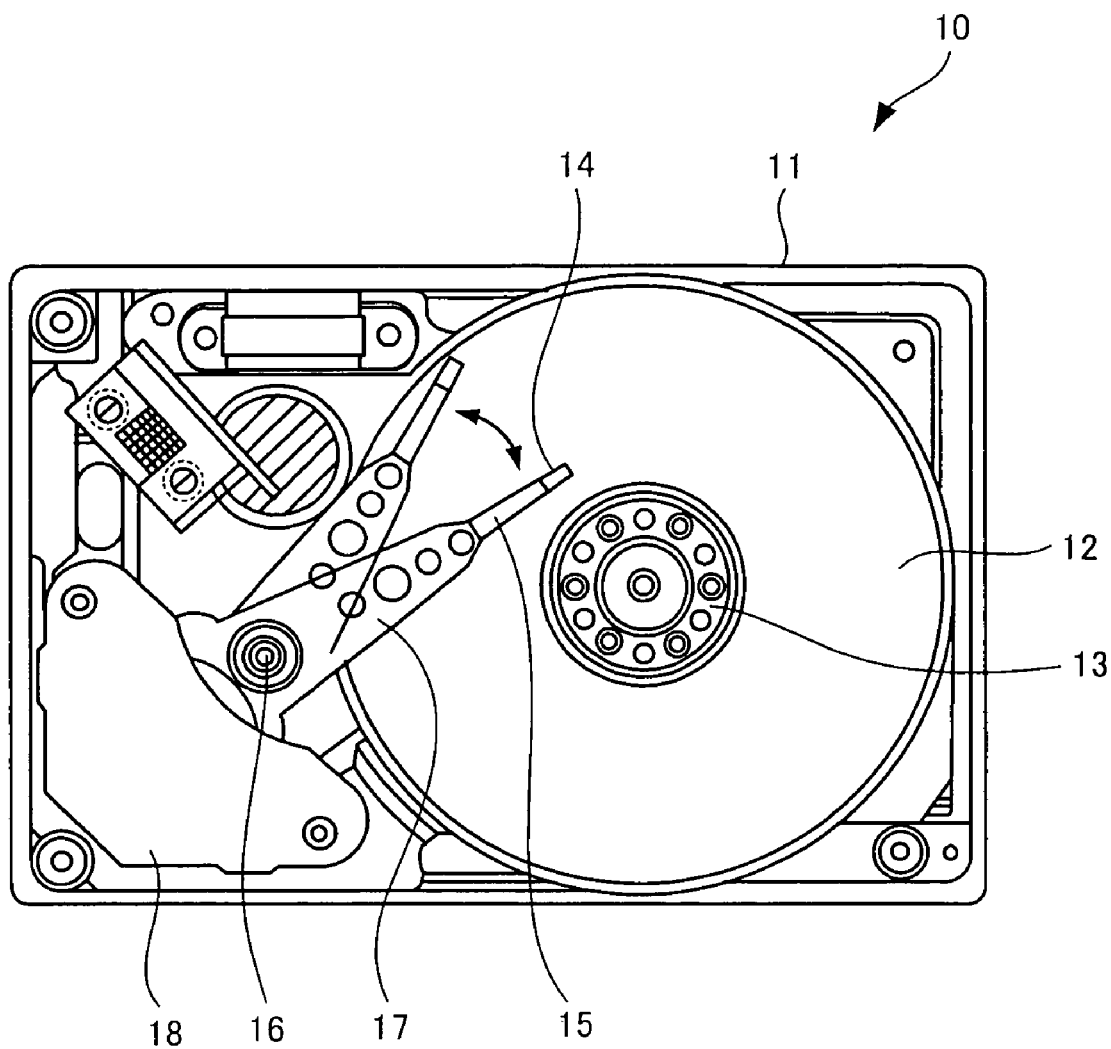
FIG. 3 is a diagram showing a hard disk drive, an embodiment of the information recording medium according to the present invention.

FIG. 3 is a diagram showing a hard disk drive, an embodiment of the information recording medium according to the present invention.

The hard disk drive (HDD) 10 shown in FIG. 3 is a so-called contact start stop (CSS) type. A housing 11 of the hard disk drive 10 houses a magnetic disk 12, an example of the magnetic recording medium according to the present invention. The magnetic disk 12 has a through-hole in the center. Within the housing 11, the through-hole 12a is provided in a hub 13 rotated by a drive motor. The magnetic disk 12 rotates as the hub 13 rotates. Also, the housing 11 houses a magnetic head 14 which records and reproduces information on/from the magnetic disk 12 as well as a suspension 15 which is equipped with the magnetic head 14 at the tip. The magnetic head 14 is installed on the suspension 15, being mounted on a slider. Furthermore, the housing 11 houses a carriage arm 17 to which the suspension 15 is fastened and which moves around an arm shaft 16 and along a surface of the magnetic disk 12 as well as an arm actuator 18 which drives the carriage arm 17. Incidentally, the internal space of the housing 11 is enclosed in a cover (not shown).

In the hard disk drive 10 shown in FIG. 3, to record information on the magnetic disk 12 and reproduce information from the magnetic disk 12, the carriage arm 17 is driven by the arm actuator 18 consisting of a magnetic circuit, the slider is driven by a piezoelectric actuator, and the magnetic head 14 is positioned on a desired track of the rotating magnetic disk 12. As the magnetic disk 12 rotates, the magnetic head 14 comes close to minute areas on the tracks of the magnetic disk 12 one after another. When recording information, an electrical recording signal is inputted in the magnetic head 14 which comes close to the magnetic disk 12, a magnetic field is applied to minute areas by the magnetic head 14 according to the recording signal, and information carried by the recording signal is recorded as magnetization directions in the minute areas. When reproducing information, the information recorded as magnetization directions in the minute areas is retrieved by the magnetic head 14 as a reproduced electrical signal corresponding to the magnetic fields generated by the magnetization directions.

Figure 4:
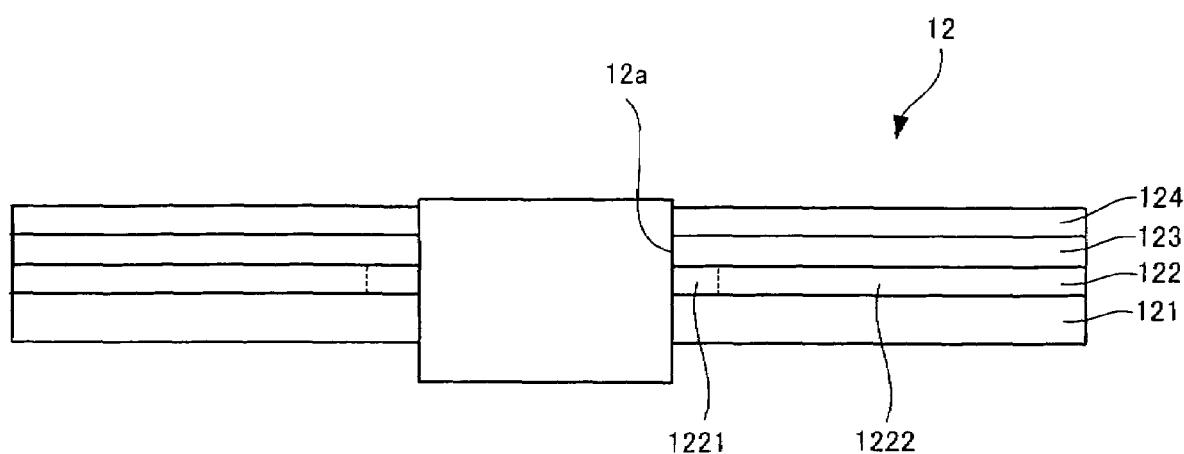
FIG. 4 is a diagram schematically showing the layer structure of the magnetic disk shown in FIG. 3.

FIG. 4 is a diagram schematically showing the layer structure of the magnetic disk shown in FIG. 3.

The magnetic disk 12 shown in FIG. 4 has a disk-shaped non-magnetic substrate 121, a magnetic layer 122 of ferromagnetic material formed on a surface of the substrate, a protective film 123 of carbon formed on a surface of the magnetic layer, and a lubricating film 124 of fluorinated oil formed on a surface of the protective layer. The substrate 121 has a through-hole in the center. The magnetic layer 122 is divided into minute areas and carries information by means of magnetization directions in the minute areas. The magnetic layer 122 carries information in an outer zone 1222 outside a predetermined inner zone (CSS zone) 1221 around the through-hole 12a in the hub 13. Hereinafter, the outer zone 1222 will be referred to as a recording zone 1222. Incidentally, the present invention is applicable not only to CSS technology, but also to ramp technology and the like. In the case of ramp technology, the inner zone of the magnetic disk corresponds to a landing zone, and the recording zone is outside the landing zone.

The lubricating film 124 plays a role in reducing wear caused by sliding of the magnetic head 14 shown in FIG. 3 and preventing the information carried by the magnetic layer 122 from being destroyed by a collision with the magnetic head 14 (head crash). The lubricating film 124 shown in FIG. 3 is obtained by applying liquid perfluoropolyether (PFPE) uniformly to the surface of the protective film with an accuracy on the order of 0.1 nm (Å) and conducting a post-treatment (described later) subsequently. Although the underside of the lubricating film 124, which is on the protective film side, is placed in intimate contact with the protective film 123, the upper side moves to the outer periphery (outer side) of the magnetic disk due to centrifugal force generated by the rotation of the magnetic disk 12. This movement is sometimes referred to as a migration phenomenon. Hereinafter, the underside of the lubricating film 124 in intimate contact with the protective film 123 will be referred to as a bonding layer while the upper side which moves to the outer side due to centrifugal force will be referred to as a free layer. The free layer has the self-repairing effect of filling scratches produced by collisions with the magnetic head 14, by being moved by centrifugal force.

The properties required of the lubricating film 124 include a low frictional coefficient (mainly the free layer), chemical stability, appropriate adhesion to the protective film 123 (mainly the bonding layer), imperviousness to humidity, etc. The solution applied to form the lubricating film 124 is not limited to PFPE, and other substances may be used. Preferably, such substances have high molecular weight to suppress molecular evaporation, low surface tension to facilitate slippage between molecules, and low viscosity to obtain proper spreadability and self-repairing effect of the free layer. Incidentally, they are not limited to liquids and may be solids.

The molecular structure of PFPE consists of a principal chain terminating in polar groups. PFPE can be synthesized from various combinations of a principal chain and polar groups. The lubrication characteristics of a lubricating film heavily depend on the principal chain structure, molecular weight, and terminating structure of PFPE. That is, the principal chain structure and molecular weight are relevant to attraction of the magnetic head 14, and the terminating structure influences the adhesion to the protective film 123. Thus, PFPE with an appropriate molecular structure should be selected, taking such relevance and influence into consideration.

To apply PFPE, a dip method or spinner method is used. With the dip method, a substrate 121 on which a protective film 123 is formed is dipped in a PFPE solution, and PFPE is applied by pulling up the substrate 121 or lowering the liquid level of the PFPE solution. The dip method, which allows easy film thickness control, is suitable for mass production. Although PFPE can be applied in such a way as to provide a uniform film thickness, this means that only uniform film thickness is available. This method has the disadvantage that impurities can get mixed in the PFPE solution, requiring a large volume of PFPE solution at the time of replenishment. On the other hand, the spinner method is weaker in mass production than the dip method, but it allows less impurities to get mixed. Also, although this method allows film thickness to be varied in the radial direction, it is difficult for this method to provide a uniform film thickness. In this embodiment, PFPE is applied by the dip method which provides a uniform film thickness.

After the application of PFPE, a post-treatment is performed to form a bonding layer. That is, the post-treatment is intended to improve adhesion between the lubricating film 124 and protective film 123, prevent the lubricating film from being worn by long hours of operation (provide migration resistance), and maintain durability. It also, increases a film thickness margin of the lubricating film in relation to friction characteristics. UV irradiation treatment is used here as the post-treatment.

For UV irradiation treatment, the substrate 121 coated with PFPE is put in a chamber and passed in front of low-pressure mercury lamps placed on both sides of the chamber. UV irradiation treatment performed in the air generates ozone, which removes organic matter from the surface coated with PFPE. Also, the UV irradiation treatment removes contamination from the surface of the protective film, increasing an active surface area, and thereby making the protective film more amenable to being bonded with the lubricating film. Incidentally, UV irradiation treatment does not produce any heat, and thus, it is necessary to remove impurities in the PFPE solution which evaporate under heat in advance. The UV irradiation treatment makes it possible to control the thickness of the bonding layer freely by adjusting irradiation time.

In this embodiment, to vary the thickness of the bonding layer in four steps in the radial direction of the substrate 121, three disk-shaped masks differing in radius are prepared. First, the recording zone 1222 is divided into four parts in the radial direction of the substrate 121: a first annular zone which surrounds the CSS zone 1221 with its inner circumference in contact with the outer circumference of the CSS zone 1221, a second annular zone which surrounds the first annular zone with its inner circumference in contact with the outer circumference of the first annular zone, a third annular zone which surrounds the second annular zone with its inner circumference in contact with the outer circumference of the second annular zone, and a fourth annular zone whose inner circumference coincides with the outer circumference of the third annular zone and whose outer circumference coincides with the outer edge of the substrate 121. All the annular zones are equal in width (radial length) Then, three masks are prepared: a first mask which covers the CSS zone 1221 and first annular zone; a second mask which covers three zones (the CSS zone 1221, first annular zone, and second annular zone); a third mask which covers four zones (the CSS zone 1221, first annular zone, second annular zone, and third annular zone). Then, the entire surface coated with PFPE is subjected to UV irradiation for a predetermined period of time and subsequently the coated surface is covered with the third mask and subjected to UV irradiation for a predetermined period of time. Next, the coated surface is covered with the second mask and subjected to UV irradiation for a predetermined period of time. Finally, the coated surface is covered with the first mask and subjected to UV irradiation for a predetermined period of time.

Incidentally, heat treatment may be used as the post-treatment instead of the UV irradiation treatment. Heat treatment also makes it possible to vary the thickness of the bonding layer in four steps in the radial direction of the substrate 121 by adjusting heating time or heating temperature. For example, the masks may be made of heat insulating material and the coated surface may be heated partially using the masks. Alternatively, the heating time or heating temperature may be varied in four steps in the radial direction of the substrate. Also, they may be varied in three or five steps rather than four steps.

Figure 5:
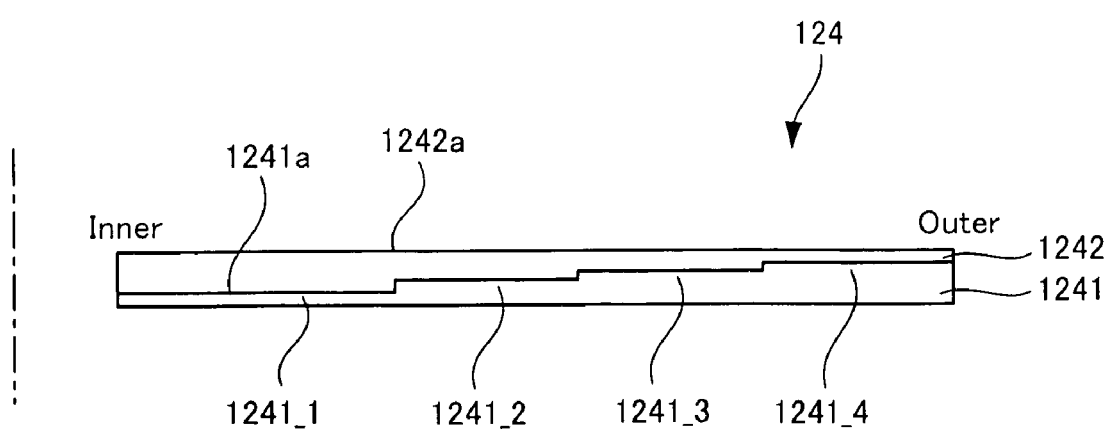
FIG. 5 is a diagram schematically showing the lubricating film in FIG. 4, where a bonding layer and free layer are distinguished from each other.

FIG. 5 is a diagram schematically showing the lubricating film in FIG. 4, with the lubricating film separated into a bonding layer and free layer.

The vertical dashed line in FIG. 5 represents the rotation center axis of the magnetic disk which has the lubricating film 124 shown in FIG. 5. The left side of FIG. 5 corresponds to the inner side of the lubricating film 124 shown in the figure, the right side corresponds to the outer side, and the left-to-right direction of the figure corresponds to the radial direction of the substrate 121 shown in FIG. 4. FIG. 5 shows a bonding layer 1241 whose surface 1241a gets higher stepwise from the inner side to the outer side. That is, the surface 1241a of the bonding layer 1241 is higher near the outer periphery than in the center of the substrate. The lowest part 1241_1 of the bonding layer 1241 corresponds to the CSS zone 1221 and the first annular zone of the recording zone 1222 on the magnetic layer 122 shown in FIG. 4. The next lowest part 1241_2 immediately on the right of the lowest part 1241_1 corresponds to the second annular zone of the recording zone 1222. The highest part 1241_4 of the bonding layer 1241 corresponds to the fourth annular zone of the recording zone 1222. The next highest part 1241_3 immediately on the left of the highest part 1241_4 corresponds to the third annular zone of the recording zone 1222.

FIG. 5 also shows a free layer 1242 whose film thickness is decreased stepwise from the inner side to the outer side. That is, that part of the free layer 1242 which is on the recording zone 1222 is thinner near the outer periphery than near the inner periphery. Also, the free layer 1242 shown in FIG. 5 has a flat surface 1242a and the film thickness of the lubricating film 124 is uniform in the radial direction of the substrate. That is, the combined thickness of the bonding layer 1241 and free layer 1242 is uniform.

With the HDD 10 shown in FIG. 3, the radial difference in the height of the bonding layer 1241 shown in FIG. 5 makes it difficult for the free layer 1242 to be moved to the outer side by centrifugal force when the magnetic disk 12 rotates. Consequently, the tendency for the free layer 1242 to become thicker on the outer side than on the inner side is reduced. Also, with the HDD 10 in FIG. 3, since the free layer 1242 shown in FIG. 5 is thinner near the outer periphery than near the inner periphery, even if a migration phenomenon occurs, the tendency for the part near the outer periphery to become thicker than the part near the inner periphery is reduced.

Figure 6:
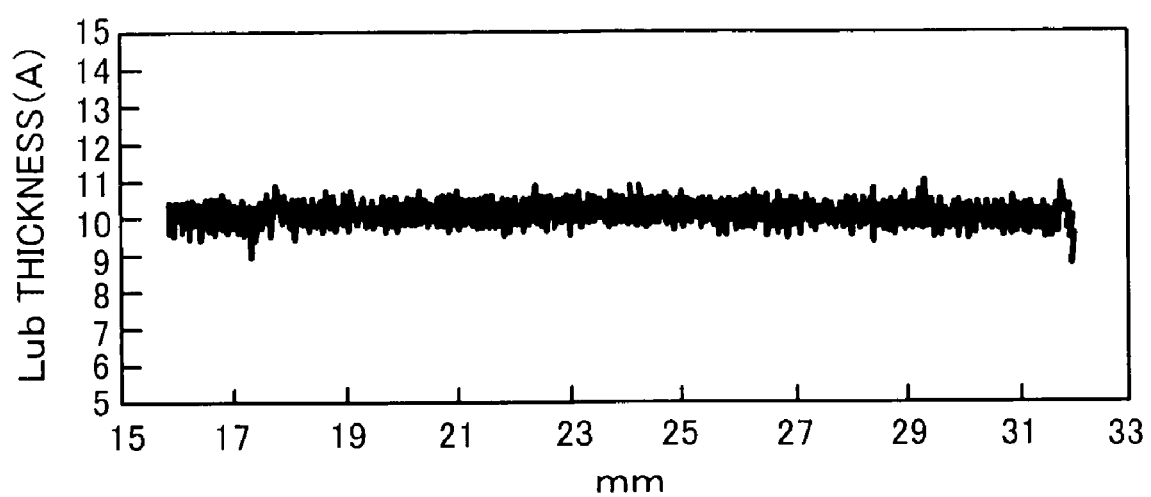
FIG. 6 is a graph showing film thickness of the lubricating film shown in FIG. 5 in the radial direction of a magnetic disk after the magnetic disk with the lubricating film is rotated continuously at 10,000 rpm in a high-temperature environment for 30 days.

FIG. 6 is a graph showing film thickness of the lubricating film shown in FIG. 5 in the radial direction of a magnetic disk after the magnetic disk with the lubricating film is rotated continuously at 10,000 rpm in a high-temperature environment for 30 days.

The horizontal axis of the graph shown in FIG. 6 represents the radial distance (mm) from the center of the magnetic disk while the vertical axis represents the film thickness (Å) of the lubricating film. The graph in FIG. 6 shows the film thickness of the lubricating film 124 in a recording zone 1222 shown in FIG. 4. It can be seen from FIG. 6 that the film thickness of the lubricating film 124 is uniform (on the order of 10 Å) in the radial direction.

Figure 7:
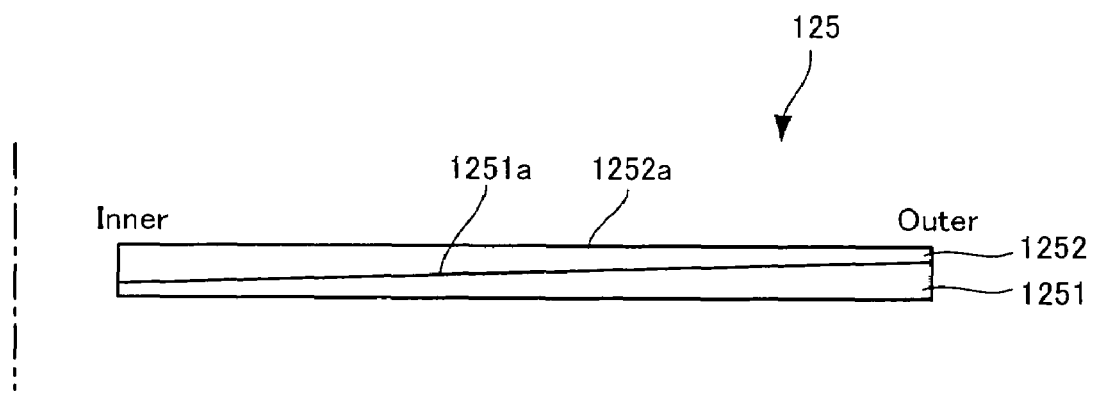
FIG. 7 is a diagram schematically showing the lubricating film obtained by changing the conditions of the post-treatment subsequent to the application of PFPE, with the lubricating film separated into a bonding layer and free layer.

FIG. 7 is a diagram schematically showing the lubricating film obtained by changing the conditions of the post-treatment subsequent to the application of PFPE, with the lubricating film separated into a bonding layer and free layer.

In FIG. 7 again, the vertical dashed line represents the rotation center axis of the magnetic disk which has the lubricating film 125 shown in FIG. 7. The left side of FIG. 7 corresponds to the inner side of the lubricating film 125 and the right side corresponds to the outer side. FIG. 7 shows a bonding layer 1251 whose surface 1251a gets higher gradually from the inner side to the outer side. Also, FIG. 7 shows a free layer 1252 whose film thickness decreases gradually from the inner side to the outer side. Again, the free layer 1252 has a flat surface 1251a and the film thickness of the lubricating film 125 shown in FIG. 7 is uniform in the radial direction of the substrate.

With the lubricating film 125 shown in FIG. 7 again, the radial difference in the height of the bonding layer 1251 shown in FIG. 7 makes it difficult for the free layer 1252 to be moved to the outer side by centrifugal force when the magnetic disk rotates. Consequently, the tendency for the free layer 1252 to become thicker on the outer side than on the inner side is reduced. Also, since the free layer 1252 shown in FIG. 7 is thinner near the outer periphery than near the inner periphery, even if a migration phenomenon occurs, the tendency for the part near the outer periphery to become thicker than the part near the inner periphery is reduced.

Incidentally, it is also possible to obtain a bonding layer 1251 whose surface 1251a gets higher gradually from the inner side to the outer side by increasing the height position of the protective film surface under the bonding layer 1251 gradually from the inner side to the outer side and applying the bonding layer 1251 uniformly in thickness.

Besides, according to the present invention, it is not absolutely necessary that the surface 1242a or 1251a of the free layer 1242 or 1252 should be flat nor that the film thickness of the lubricating film 124 or 125 should be uniform in the radial direction.

As described above, the magnetic recording medium according to this embodiment reduces the tendency for the free layer to become thicker near the outer periphery than near the inner periphery of the recording zone.

What is claimed is:

1. A magnetic recording medium which records information using magnetization directions, comprising:
   a disk-shaped substrate which has a through-hole in the center;
   a magnetic layer which is provided on the substrate and records information using the magnetization directions;
   a protective layer which is provided on the magnetic layer;
   a bonding layer which is attached to the protective layer and contains a lubricant component; and
   a free layer which contains a lubricant component and is movable on the bonding layer toward the outer periphery of the substrate as the magnetic recording medium rotates around the center of the substrate,
   wherein the magnetic layer carries information in an outer zone outside a predetermined inner zone around the through-hole,
   wherein the thickness of the free layer gradually decreases from the inner periphery to the outer periphery, while the thickness of the bonding layer gradually increases from the inner periphery to the outer periphery,
   wherein the combined thickness of the bonding layer and the free layer is uniform in the radial direction of the substrate; and
   wherein the free layer covers the entire surface of the bonding layer.

2. The magnetic recording medium according to claim 1, wherein the free layer has a flat surface.

3. A magnetic recording medium according to claim 1, wherein a surface of the bonding layer is higher near the outer periphery than the center of the substrate.

4. The magnetic recording medium according to claim 3, wherein the free layer has a flat surface.

5. An information reproducing apparatus that, being equipped with a disk-shaped magnetic recording medium on which information is recorded by means of magnetization and a magnetic head placed in close vicinity to or in contact with the magnetic recording medium to detect magnetization at various points on the magnetic recording medium, reproduces information according to the detected magnetization at the various points on the magnetic recording medium by rotating the magnetic recording medium, wherein:
   the magnetic recording medium which records information using magnetization directions comprises:
   a disk-shaped substrate which has a through-hole in the center,
   a magnetic layer which is provided on the substrate and records information using the magnetization directions,
   a protective layer which is provided on the magnetic layer,
   a bonding layer which is attached to the protective layer and contains a lubricant component, and
   a free layer which contains a lubricant component and is movable on the bonding layer toward the outer periphery of the substrate as the magnetic recording medium rotates around the center of the substrate;
   the magnetic layer carries information in an outer zone outside a predetermined inner zone around the through-hole;
   wherein the thickness of the free layer gradually decreases from the inner periphery to the outer periphery, while the thickness of the bonding layer gradually increases from the inner periphery to the outer periphery,
   wherein the combined thickness of the bonding layer and the free layer is uniform in the radial direction of the substrate; and
   wherein the free layer covers the entire surface of the bonding layer.

6. The information reproducing apparatus according to claim 5, wherein the free layer has a flat surface.

7. An information reproducing apparatus according to claim 5, wherein a surface of the bonding layer is higher near the outer periphery than near the center of the substrate.

8. The information reproducing apparatus according to claim 7, wherein the free layer has a flat surface.

* * * * *